United States Patent

[11] 3,589,566

| [72] | Inventors | Daniel James Rivest<br>1705 Highland Ave., Manhattan Beach, Calif. 90266;<br>Paul Malot Evans, 2105 Reynolds St., Falls Church, Va. 22043 |
|---|---|---|
| [21] | Appl. No. | 820,132 |
| [22] | Filed | Apr. 29, 1969 |
| [45] | Patented | June 29, 1971 |

[54] INSULATED CONTAINER
8 Claims, 5 Drawing Figs.

[52] U.S. Cl. .................................................. 222/132, 215/13
[51] Int. Cl. .................................................. B67d 5/60, B67d 5/64
[50] Field of Search ...................................... 222/132, 129; 215/13, 12; 220/9 F, 20

[56] References Cited
UNITED STATES PATENTS

| 1,238,842 | 9/1917 | Spellmeyer .................. | 222/132 X |
| 2,246,693 | 6/1941 | Ohme .......................... | 222/129 X |
| 2,551,842 | 5/1951 | Kirchner ..................... | 222/129 X |
| 3,313,438 | 4/1967 | Piker ........................... | 215/13 |

FOREIGN PATENTS

| 793,130 | 8/1968 | Canada ....................... | 222/132 |

Primary Examiner—Raphael H. Schwartz
Attorney—John Cyril Malloy

ABSTRACT: An insulated container which includes a main chamber and a plurality of separate compartment elements to be received in the chamber and each being adapted to receive a separate fluid to be maintained at a relatively stable temperature condition for a prolonged period of time. The container includes a plurality of passageways in the bottom with a mouth opening into the chamber and an exit port provided with spigot and valve means to control fluid flow from within the chamber. Each of the compartment elements includes a spout sized to be received within the mouth opening of the passageways.

PATENTED JUN 29 1971      3,589,566

INVENTORS
DANIEL JAMES RIVEST
PAUL MALOT EVANS

BY  John Cyril Malloy

ATTORNEY

INSULATED CONTAINER

This invention relates to a container which is insulated and in which there are provided a plurality of separate compartments which interconnect through a passageway to a spigot means so that in the single container a plurality of separate flowable materials, such as various types of cold beverages, may be stored and dispensed through spigot means which are provided.

Quite often at picnics and the like it is desirable to have a selection of cooled beverages or, alternatively, a selection of warm beverages, such as coffee or tea. The present invention provides a container which includes a plurality of discrete compartments interconnected through the insulation of the container to a spigot means provided on the exterior of the container so that a selection may be made by a user of the beverage which he prefers.

It is, accordingly, an object of this invention to provide an improved insulated container which includes an insulated wall and bottom with a plurality of passageways in the bottom extending from discrete compartment elements in the chamber, each compartment being adapted to hold a separate fluid, to a spigot means on the exterior of the container so that, at the option of the user, any one of several separate fluids may be dispensed.

It is another object of this invention to provide an inexpensive container which is insulated and which is adapted to be used, alternatively, for dispensing hot or cold beverages and which is constructed of inexpensive lightweight materials and which is especially adaptable for use at picnics and the like.

In accordance with these and other objects which will become apparent hereinafter the instant invention will now be described with reference to the accompanying drawings in which.

Figure 4:
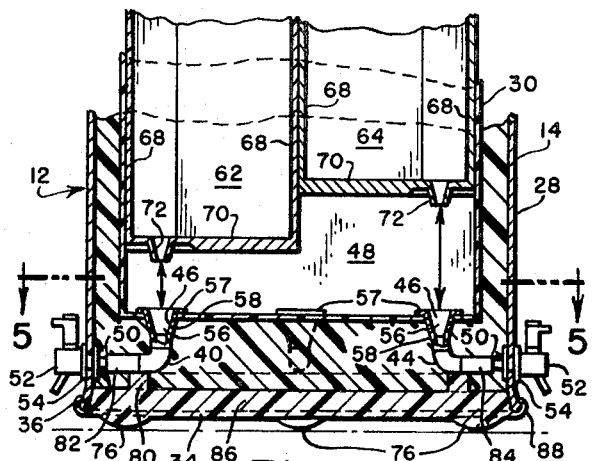
FIG. 4 is a partial view of the container of FIG. 1 and illustrating the lower portion thereof.
Figure 1:
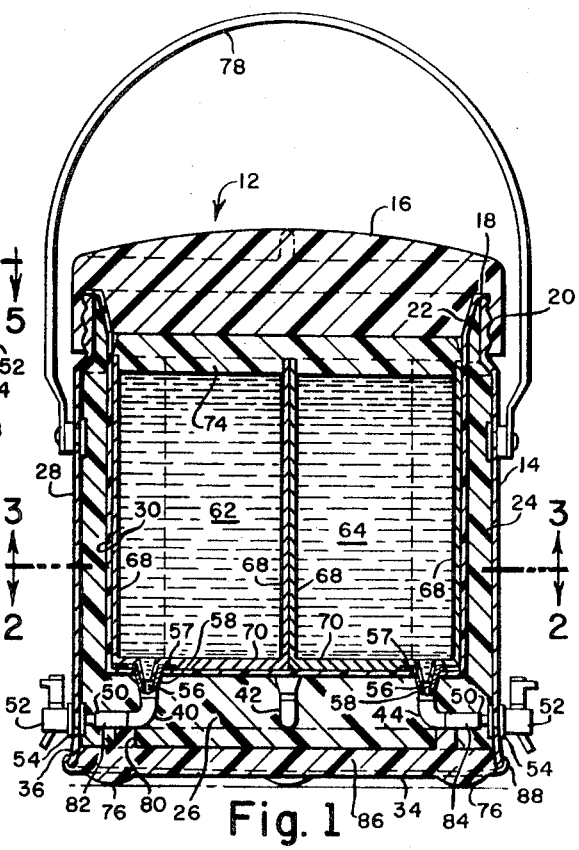
FIG. 1 is a view in cross section of a preferred embodiment of the container.

Referring to the drawings wherein like referenced characters designate like or corresponding parts throughout the several views, there is shown the insulated container which is generally designated by the numeral 12 and is seen to include a generally cylindrical body 14 and a main cap means 16, preferably having a recess 18 sized to receive the threaded lip 20 about the opening 22 at the upper end of the sidewalls 24. The main thickness wall and bottom 26 is of a foam material which is somewhat porous and in the preferred embodiment, outer and inner water impervious liners 28 and 30 are provided. Also a water-impervious bottom plate 34 is provided spanning the lower end 36 of the outer liner for the sidewalls. Within the bottom 26 a network comprising a plurality of lined passageways such as 40, 42, 44 and 44' are provided, each having a mouth such as that designated by the numeral 46 in open communication with the interior of the chamber 48, FIG. 4, of the cylindrical body. The passageways terminate at the sidewall as at 50 and, to control fluid flow, they are provided with a valve and spigot means such as that designated by the numeral 52. A fitting 54 to embracingly engage the opposite sides of the outer liner 28 is preferably provided to effect a relatively rigid mounting for the spigot. Also the mouth opening of the passageway is provided with a spout nest 56 opening into the chamber at a flanged lip 57 and into the associated passageway at a tapered portion 58.

Figure 3:
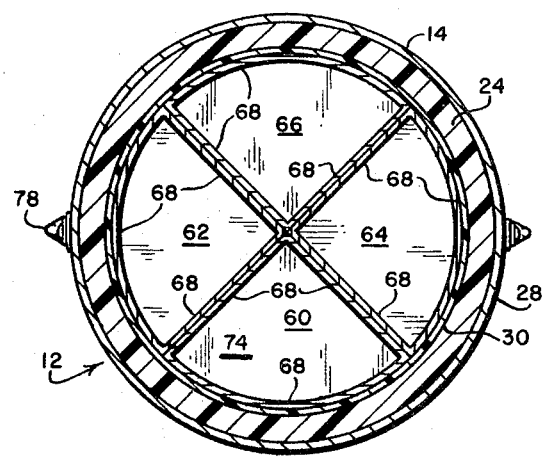
FIG. 3 is a view in cross section taken on the plane indicated by the line 3-3 of FIG. 1 and looking in the direction of the arrows.
Figure 5:
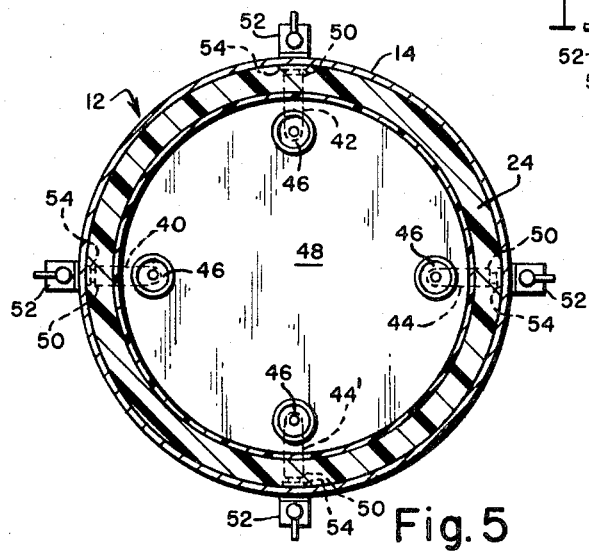
FIG. 5 is a view in cross section taken on the plane indicated by the line 5-5 and looking in the direction of the arrows.
Figure 2:
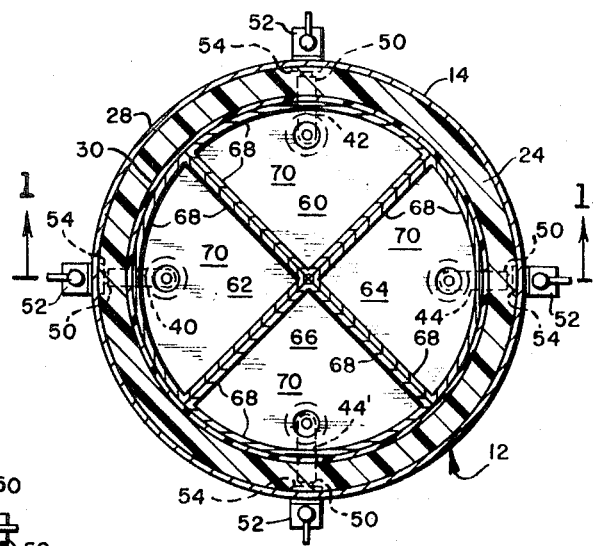
FIG. 2 is a view in cross section taken on the plane indicated by line 2-2 in FIG. 1 and looking in the direction of the arrows.

A septum means is provided to divide the chamber into discrete compartments above the mouth openings so that separate batches of separate flowable materials may be provided in the chamber. In the preferred embodiment the septum means constitutes a plurality of liquid impervious compartment elements designated by the numerals 60, 62, 64 and 66 in FIG. 3, for instance, and each of which compartment elements includes a side 68 and a floor 70. The compartment elements are sized and configured to occupy a complementary longitudinally extending portion of the container chamber when positioned therein. Each of the compartment elements is provided with a depending spout portion 72 which extends so as to be receivable within the spout nest of the passageway associated therewith when the compartment elements are assembled in the chamber. To close the compartment elements an inner cap 74 is provided and it will be seen that the container thus defined is adapted to carry discrete supplies of flowable material, such as hot coffee, tea or milk or, alternatively, cold beverages of various types. The bottom plate is provided with a plurality of support feet 76 and the container is provided with handle means such as the bail 78 heavy conventional elements to attach the same to the relatively hard outer skin or liner.

In the preferred embodiment the intermediate layer of insulation material of the sidewalls is of a suitable foam material such as that of styrene polymer or polyurethane, while the outer and inner liner layers are of a relatively rigid, nonporous plastic material, as is the bottom or close-off plate. The bottom is provided with an access opening 80 leading to each of the passageways to accommodate the conduit elements 82 and 84, and the bottom plate is provided with plug portions 86 to dwell therein when the plate is secured as at 88 to the lower end of the container wall.

As indicated in FIG. 4, a user may selectively use those compartment elements which he desires to use and fill the remaining space of the main chamber 48 with ice to provide additional cooling for a prolonged period. Also, if desired, all of the compartment elements may be removed and the container employed as an ice chest with drainage for melted ice taking place when desired by the user simply by operating the spigot means. The inner cap 74 is preferably provided with a peripheral recess and for elongated diametrical slots in the surface confronting the compartment elements to receive the upper terminal edges of those elements therein and, in this manner, to prevent spilling of material in the separate containers into one another and, additionally, it serves as additional insulating material and as a spacer in the event that all of the compartment elements are not used at the same time.

What we claim is:

1. An insulated container, comprising: a cylindrical body having an insulated bottom and walls defining an open top chamber, a plurality of passageways in the bottom, each of said passageways having a mouth opening into the chamber and an exit port in the sidewall of the body, spigot means including a valve connected to the sidewall at the ports to control fluid flow from the chamber, septum means to divide the chamber into discrete compartments above said mouth openings, so that separate batches of flowable material are adapted to be carried in the container and discharged separately by said spigot means, and cap means to close the open top;

said septum means comprising a complement of separate compartment elements, each including a floor and a side and each sized and configured to occupy a complementary longitudinally extending portion of the chamber when positioned therein, each of said elements including a spout extending from the floor and said spouts being sized for companionate receipt in nesting relation in one of the mouth openings.

2. The insulated container as set forth in claim 1 wherein the insulated walls and bottom comprise an inner and outer layer of water impervious liner material and an intermediate layer of foam material.

3. The insulated container as set forth in claim 1 wherein the insulated walls and bottom comprise an inner and an outer layer of water impervious liner material and an intermediate layer of foam material.

4. An insulated container as set forth in claim 3 wherein handle means are provided on said body and cap means of insulation material are provided to close said open top.

5. An insulated container as set forth in claim 4 wherein a spout nest is provided in the mouth of said passageways to receive said spouts.

6. An insulated container as set forth in claim 1 wherein said bottom includes a layer of insulation material and is provided with a downwardly opening access opening in communication with each of the passageways, and an outer layer of rigid material including means to connect the bottom in spanning relation of said body and plug-type extensions arranged on said bottom to be received within said access openings when assembled to said body.

7. An insulated container as set forth in claim 2 wherein said bottom includes a layer of insulation material and is provided with a downwardly opening access opening in communication with each of the passageways, and an outer layer of rigid material including means to connect the bottom in spanning relation of said body and plug-type extensions arranged on said bottom to be received within said access openings when assembled to said body.

8. An insulated container as set forth in claim 7 wherein mounting means are provided for said spigot means, said mounting means comprising confronting plates spaced from one another a thickness substantially equal to the thickness of the outer layer of said sidewall.